US011876808B2

(12) United States Patent
Pendse

(10) Patent No.: US 11,876,808 B2
(45) Date of Patent: Jan. 16, 2024

(54) DETECTING PHISHING ATTACKS ON A NETWORK

(71) Applicant: Arbor Networks, Inc., Westford, MA (US)

(72) Inventor: Bhargav Pendse, MH (IN)

(73) Assignee: ARBOR NETWORKS, INC., Westford, MA (US)

( * ) Notice: Subject to any disclaimer, the term of this patent is extended or adjusted under 35 U.S.C. 154(b) by 321 days.

(21) Appl. No.: 16/790,461

(22) Filed: Feb. 13, 2020

(65) Prior Publication Data

US 2021/0203676 A1   Jul. 1, 2021

(30) Foreign Application Priority Data

Dec. 27, 2019   (IN) .............................. 201911054124

(51) Int. Cl.
*H04L 9/00* (2022.01)
*H04L 9/40* (2022.01)

(52) U.S. Cl.
CPC ...... *H04L 63/1416* (2013.01); *H04L 63/1483* (2013.01)

(58) Field of Classification Search
CPC ........................ H04L 63/1416; H04L 63/1483
See application file for complete search history.

(56) References Cited

U.S. PATENT DOCUMENTS

| 7,496,634 B1 * | 2/2009 | Cooley | G06Q 10/107 709/225 |
| 9,979,748 B2 * | 5/2018 | O'Connor | H04L 63/145 |
| 2016/0065611 A1 * | 3/2016 | Fakeri-Tabrizi | H04L 63/1441 726/23 |
| 2018/0069883 A1 * | 3/2018 | Meshi | H04L 63/1425 |

* cited by examiner

*Primary Examiner* — Daniel B Potratz
*Assistant Examiner* — Syed M Ahsan
(74) *Attorney, Agent, or Firm* — Foley & Lardner LLP

(57) ABSTRACT

A method, system, and computer-implemented method to manage threats to a protected network having a plurality of internal production systems is provided. The method includes monitoring network traffic from the plurality of internal production systems of a protected network for domain names. For each internal production system, a first collection of each unique domain name that is output by the internal production system is determined over the course of a long time interval. For each internal production system, a second collection of each unique domain name that is output by the internal production system is determined over the course of a short time interval. Domain names in the first and second collections associated with the plurality of internal production systems are compared to determine suspicious domain names that meet a predetermined condition. A request is output to treat the suspicious the suspicious domain names as being suspicious.

17 Claims, 4 Drawing Sheets

US 11,876,808 B2

DETECTING PHISHING ATTACKS ON A NETWORK

FIELD OF THE INVENTION

The disclosed embodiments generally relate to computer network protection, and more particularly, to a system and method for detecting phishing attacks on a network.

BACKGROUND OF THE INVENTION

Networks are constantly exposed to security exploits that are of significant concern to network providers. Advanced persistent threats (APTs) are stealthy attacks in which unauthorized access is gained to a computer network. APTs can persist for extended periods while remaining undetected. APTs can occur across business sectors. Advanced actors perpetrating APTs have been known to attack with specific goals, such as to steal from, spy on, or disrupt a computer network.

Phishing attacks can be used by an advanced actor at an early stage of an APT attacks for making a first entry into a target computer network, after which the APT attack can advance to next stages. In a phishing attack, in a first stage, using reconnaissance techniques, the advanced actor can find multiple people who work in a target organization. Information about the people found can include determining their email addresses and/or social networking profiles. At a next stage, phishing can begin by luring such users to access malicious content, such as by accessing a Uniform Resource Locator (URL) or malicious content offered in an email or on a website or application, often a social media platform, which results in a payload being installed on their computing device or another computing device of the computer network their computing device is using. Once installed, the payload can perform malicious acts.

While conventional methods and systems for detecting phishing attacks have generally been considered satisfactory for their intended purpose. However, there is still a need in the art for early stage detection of phishing attempts.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for managing threats to a network having a plurality of internal production systems is provided. The method includes monitoring network traffic from the plurality of internal production systems of a protected network for domain names. For each internal production system, a first collection of each unique domain name that is output by the internal production system is determined over the course of a long time interval. For each internal production system, a second collection of each unique domain name that is output by the internal production system is determined over the course of a short time interval. Domain names in the first and second collections associated with the plurality of internal production systems are compared to determine suspicious domain names that meet a predetermined condition. A request is output to treat the suspicious the suspicious domain names as being suspicious.

In aspects of the disclosure, a computer system and computer-readable medium are provided that implement the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
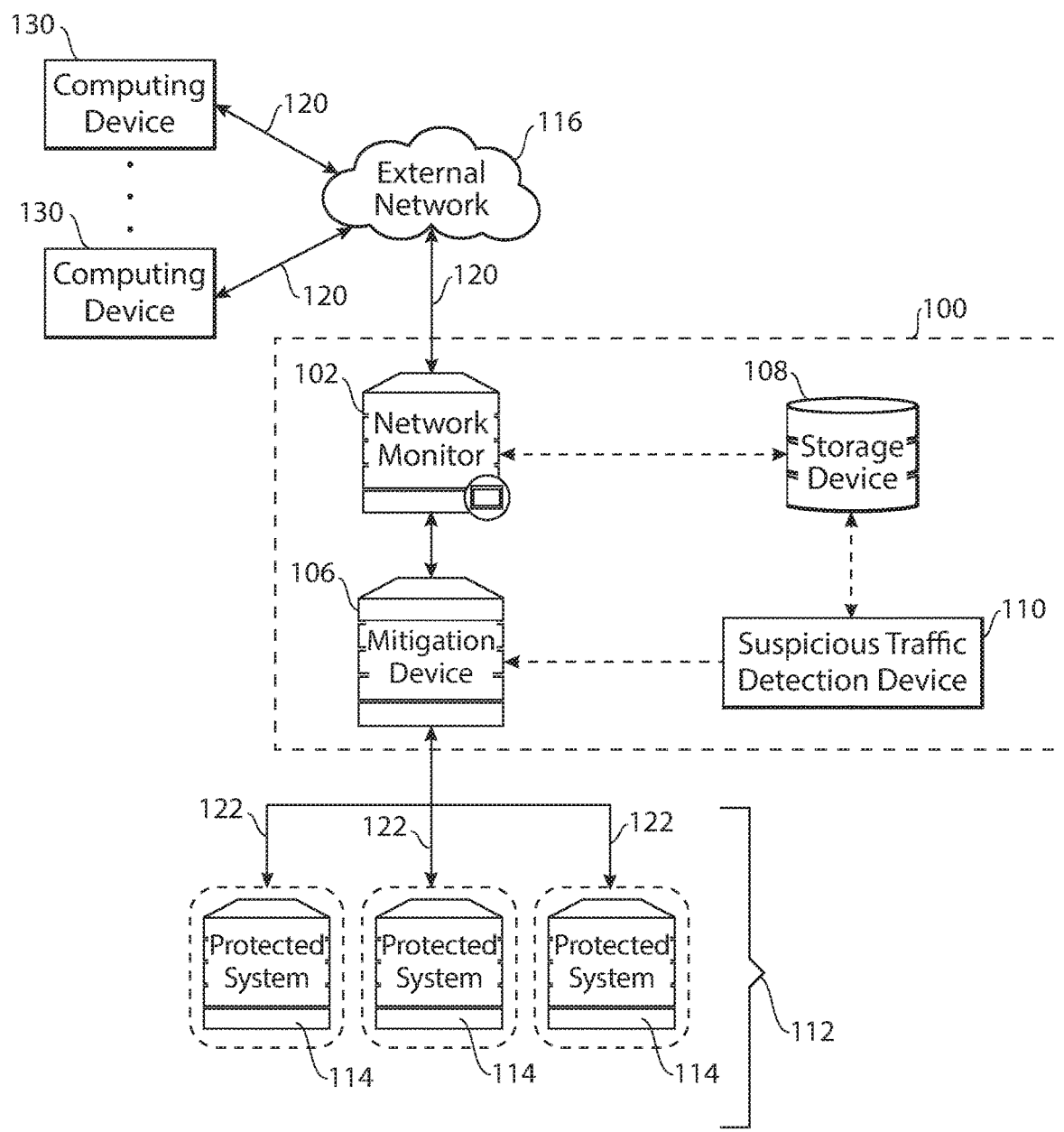
FIG. 1 illustrates a block diagram of an example network protection system operating with one or more communication networks in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network protection system in accordance with the disclosure is shown in FIG. 1 and is designated generally by reference character 100. Other embodiments of the network protection system 100 in accordance with the disclosure, or aspects thereof, are provided in FIGS. 2-4, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the network protection system 100 is provided that monitors network traffic to and from one or more protected networks 112. In the example shown, one protected network 112 is shown, however one skilled in the art will recognize that the network protection system 100 can provide a protection service to multiple protected networks 112. Protected network 112 includes one or more internal production systems (IPSs) 114. The network protection system 100 is configured to monitor network traffic from the IPSs 114 for domain names.

Unique domain names (also referred to as domain name system (DNS) names) output per IPS 114 of the protected network 112 over the course of a short interval are compared to unique DNS names output per IPS 114 over a long interval. A DNS name is a registered name that can be resolved by a DNS server (not shown) to an internet protocol (IP) addresses. When a DNS name has been output by a threshold number of IPSs 114 as a unique DNS name in a group of one or more short intervals, but was not included in the unique DNS names output by the IPS 114 over the course of the long interval, that DNS name is treated as being suspicious The network protection system 100 includes a network monitor 102, a mitigation device 106, a suspicious traffic detection device 110, and a storage device 108. Dotted lines represent communication links (wired or wireless) for control or data flow between the components of the network protection system 100, namely network monitor 102, mitigation device 106, storage device 108, and suspicious traffic detection device 110. Solid lines represent communications links for network traffic flow, including communication links 120 and 122. Network traffic flows to and from external network 116 via wired and/or wireless communication links 120. Network traffic flows between the network monitor 102 or mitigation device 106 of the network protection system 100 and the IPSs 114 of the protected network 112 via wired and/or wireless communication links 122.

The network monitor 102 is configured to monitor network traffic output by IPS s 114, including network traffic transmitted via external network 116 to one or more computing devices 130 or network traffic transmitted to another IPS 114 via the protected network 112. Any of computing devices 130 can be a malicious computing device that uses the external network 116.

In the example shown, network protection system 100 is configured so that network traffic from external network 116 passes through network monitor 102 before reaching mitigation device 106, and mitigation device 106 communicates with the IPSs 114 via communication links 122. The disclosure is not limited to this configuration. In one or more embodiments, network protection system 100 is configured so that network traffic from external network 116 passes through mitigation device 106 before network monitor 102, and network monitor 102 communicates with the IPSs 114 via communication links 122.

Network monitor 102, suspicious traffic detection device 110, and/or mitigation device 104 can be integrated in a single device or share one or more hardware or software components. Additionally, the network monitor 102, suspicious traffic detection device 110, and mitigation device 104 can be implemented as physical or virtual devices. Whether implemented as physical or virtual device(s). Each of network monitor 102, suspicious traffic detection device 110, and/or mitigation device 104 uses a local or remote hardware processing device that executes software instructions, which enables performance of the disclosed functions.

Network monitor 102, suspicious traffic detection device 110, and/or mitigation device 104, whether configured in combination or separate from one another, includes a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. The storage medium can also store analyzing criteria for detecting threat traffic from among the network traffic.

Storage device 108 includes computer system readable media in the form of volatile or non/volatile memory or storage media, such as random access memory (RAM), cache memory, a magnetic disk, an optical disk, etc. Storage device 108 is in communication with the network monitor 102 for storing collections of information selected from network traffic by network monitor 102. Furthermore, storage device 108 is accessible by the network monitor 102 and the suspicious traffic detection device 110 for allowing storage of data and performance of analysis on the data stored by storage device 108. Storage device 108 and/or suspicious traffic detection device 110 can be integrated with or external from network monitor 102.

In embodiments, at least portions of the network protection system 100 are located between the external network 116 and the protected network 112. In other embodiments, at least portions of the network protection system 100 are located within the external network 116 or protected network 112. At least portions of the network protection system 100 can be located at a network edge (inside or outside of the protected network 114) or deeper within the protected network 112.

The network monitor 102 includes or communicates with hardware, firmware, and/or software components that are configured to observe content of packets included in network traffic. Network monitor 102 can include central or distributed elements for intercepting and/or analyzing network data. These elements can be passive or active and include software, firmware, and/or hardware components, such as taps, probes, or port mirrors. These elements can be positioned inline, and/or remote relative to communication links 120 and 122.

The mitigation device 106 can be implemented using hardware, software, firmware, or a combination thereof. In embodiments, mitigation device 106 can include one or more mitigation devices, each implemented using different physical devices. In embodiments, or one or more of the mitigation devices 106 can share one or more software, hardware, or firmware components.

Each IPS 114 can be a device such as a server, laptop device, network element (such as routers, switches, and firewalls), embedded computer device that is embedded in other devices, such as appliances, tools, vehicles, or consumer electronics, mobile devices, such as laptops, smartphones, cell phones, and tablets.

Protected network 114 supports communication between IPSs 114. Protected network 114 can include one or more networks, such as an intranet, a local area network (LAN), and/or a wide area network (WAN). In examples, the protected network 112 can be an enterprise network, such as a school network, business network, and government network, to list a few examples, that can connect to the Internet. The external network 116 can include one or more WANs, e.g., the Internet, which may be used to access protected network 112.

During a reconnaissance stage of an attack, an attacker, such as a user of a malicious computing device 130, can find multiple users operating IPSs 114 in the same protected network 112, such as people that work in the same company, people that work for the same government entity, or students/professors using the same university computer network. The attacker would also find contact information for these individuals, such as their email and/or social media contact information.

During a next stage of the attack, a phishing expedition can include the attacker luring each of the users discovered during the reconnaissance stage to use their IPS 114 to access malicious content. This can include sending or posting the malicious content via email or social media in a manner to entice the user to access the malicious content, such as by using social engineering techniques. The malicious content is packages to seem harmless, such as to appear as if it is from a familiar source.

The malicious content, posing as harmless content, can include, for example, a uniform resource locator (URL) or a hyperlink that the user was led to believe will allow the user's IPS 114 to access a website or a resource (e.g., without limitation, a pdf, video, audio, or picture file). The content can be disguised to appear as if it is from a familiar source, such as a commonly used website. One method to gain user trust is for the attacker to provide a spoofed website or email address that appears to have a familiar name, but is located at an IP address controlled by the attacker.

The attacker and/or the DNS name provided by the malicious content can be an external malicious computer of computing devices 130 or one of the IPSs 114 that is now commanded and controlled by a malicious computer (also referred to as a botnet). The IP address of the attacker can be the same or different as the IP address resolved from the DNS name provided by the malicious content.

Once the IPS 114 accesses the malicious content, e.g., the URL or hyperlink, the IPS 114 sends a request, e.g., an HTTP request (or the like, e.g., secure HTTP (HTTPS)) and/or a DNS request using a DNS name provided by the malicious content that can be resolved to an IP address. The DNS name used in the HTTP request or the DNS request will be a DNS name for the attacker, even if the attacker is acting as an imposter for a familiar source. For example, the attacker may pretend to be a familiar source, such as GOOGLE™.COM by using a name and/or graphics that are visually similar to those used by GOOGLE.COM, however the HTTP or DNS request will not use GOOGLE.COM. but will use a different DNS name specific to the attacker, which would be transparent to the IPS 114 user.

Additionally, the malicious content can include a payload that becomes installed on the IPS 114 when the malicious content is accessed. The installed payload can be configured to perform a malicious deed, such as to exfiltrate information from (e.g., sensitive data, credentials, secrets, etc.), spy on, and/or disrupt the IPS 114 or its protected network 112.

Network monitor 102 monitors the network traffic along communication links 122 transmitted from the IPS s 114 by identifying network traffic that includes DNS names, such as by detecting DNS requests or messages that use a protocol for communicating via the World Wide Web, e.g., Hypertext Transfer Protocol (HTTP) messages or the like. Network monitor monitors the network traffic over a long time interval to determine each unique DNS names output per IPS 114 over the course of the long time interval. The long time interval can be, for example one month, but without limiting the long time interval to a particular amount of time. Each unique DNS name is stored in a long-term collection in association with the IPS 114 that output the DNS name in network traffic. The process can be repeated for the next long time interval.

The long-term collections can be recycled (meaning emptied and reused) when they are no longer being used for comparing, or stale entries can be removed periodically. A stale entry can be an entry that was output by an IPS 114 more than one long-time interval ago. Determining that a DNS name is unique over the long time interval for the IPS 114 that output the DNS name includes comparing the DNS name to determine whether a unique DNS name is already stored in the long-term collection for that DNS name, if any.

Network monitor 102 further monitors the network traffic over short time intervals to determine each unique DNS names output per IPS 114 over the course of the short time interval. The short time interval can be, for example one day, but without limiting the short time interval to a particular amount of time. Each unique DNS name is stored in a short-term collection in association with the IPS 114 that output the DNS name in network traffic.

The short-term collections can be recycled (meaning emptied and reused) when they are no longer being used for comparing, or stale entries can be removed periodically. A stale entry can be an entry that was output by an IPS 114 more than one short-time interval ago. Determining that a DNS name is unique over the short time interval for the IPS 114 that output the DNS name includes comparing the DNS name to determine whether a unique DNS name is already stored in the short-term collection for that DNS name, if any.

The suspicious traffic detection device 110 compares DNS names in the short-term collections with the long-term collection that corresponds to a previous long time interval to determine DNS names that meet a predetermined condition. The previous long time interval can be the most recent long time interval completed. DNS names that meet the predetermined condition are treated as being suspicious domain names. For example, the short-term list for each IPS 114 can be compared to the long-term list for the IPS 114 to determine unique DNS names output during the short time interval that were not output during the long time interval. The predetermined condition can be satisfied, for example, when a threshold number (N) of IPSs 114 are determined to be associated with the DNS name as having been determined to be unique in the respective IPSs' 114 short-term collections corresponding to a set of short time intervals. The set of short time intervals can be X short time intervals that occurred within a span of Y short time intervals, wherein X and Y are predetermined numbers greater than or equal to one, wherein X<=Y. The predetermined condition can require that the Y short term intervals be consecutive and/or the most recent short time intervals.

For example, when N=10, X=5, and Y=7, the predetermined condition can be satisfied when a unique DNS name output by ten ISPs 114 occurred in short-term collections associated with five short time intervals within a set of seven consecutive short time intervals.

In one or more embodiments, a DNS name that was determined to be suspicious is compared to a white list of DNS names, wherein the white list refers to DNS names that are confirmed to not be suspicious. The DNS name is only treated as suspicious if it is not include in the white list.

In one or more embodiments, one or more attributes are associated with the various DNS names. The attribute can be determined, for example, by consulting with a registry through which the DNS name was registered. For example, the attribute can indicate a time at which or a country in which the DNS name was registered. The DNS name is only treated as suspicious if the attribute fails to satisfy a predetermined condition. For example, the predetermined condition can be defined as the attribute of the date of registration being at least one year ago. In this case, the DNS name is treated as suspicious only if it was registered less than one year ago. In another example, the predetermined condition can be defined as the attribute of the country of registration being different than certain countries that are listed as being under suspicion for allowing illegitimate registrations. Suspicious traffic detection device 110 informs mitigation device 108 of each instance in which it has been determined that DNS name should be treated as suspicious. In one or more embodiments, the mitigation device 108 can be configured to treat a DNS name as being suspicious by taking a precautionary action. Precautionary actions can include reporting the suspicious DNS name in a report, displaying the suspicious DNS name on a user interface, or warning users via each IPS's browser regarding receiving from or sending traffic to the suspicious DNS name. The warning can be triggered when a user's IPS 114 attempts to receive from or send to the suspicious DNS name. In one or more embodiments, the mitigation device 108 can be configured to treat a DNS name as being suspicious by taking a blocking action. Blocking actions can include blocking the suspicious DNS names, blocking the suspicious DNS names only when a confirmation of suspicion is received, or quarantining each IPS 114 that receives traffic from or sends traffic to the suspicious DNS name.

Figure 2:
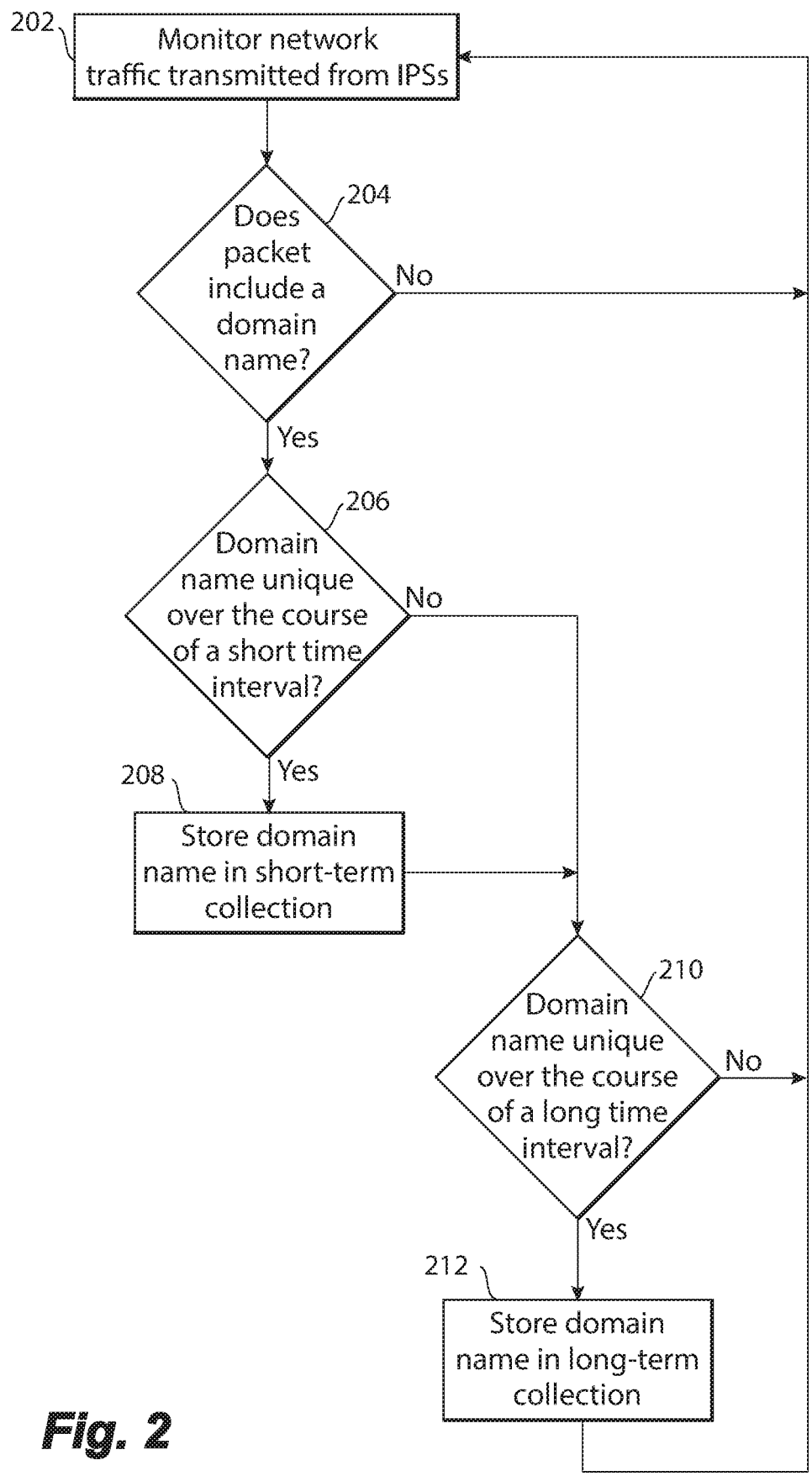
FIG. 2 is an example flowchart showing a method performed by a network monitor of the network protection system shown in FIG. 1.
Figure 3:
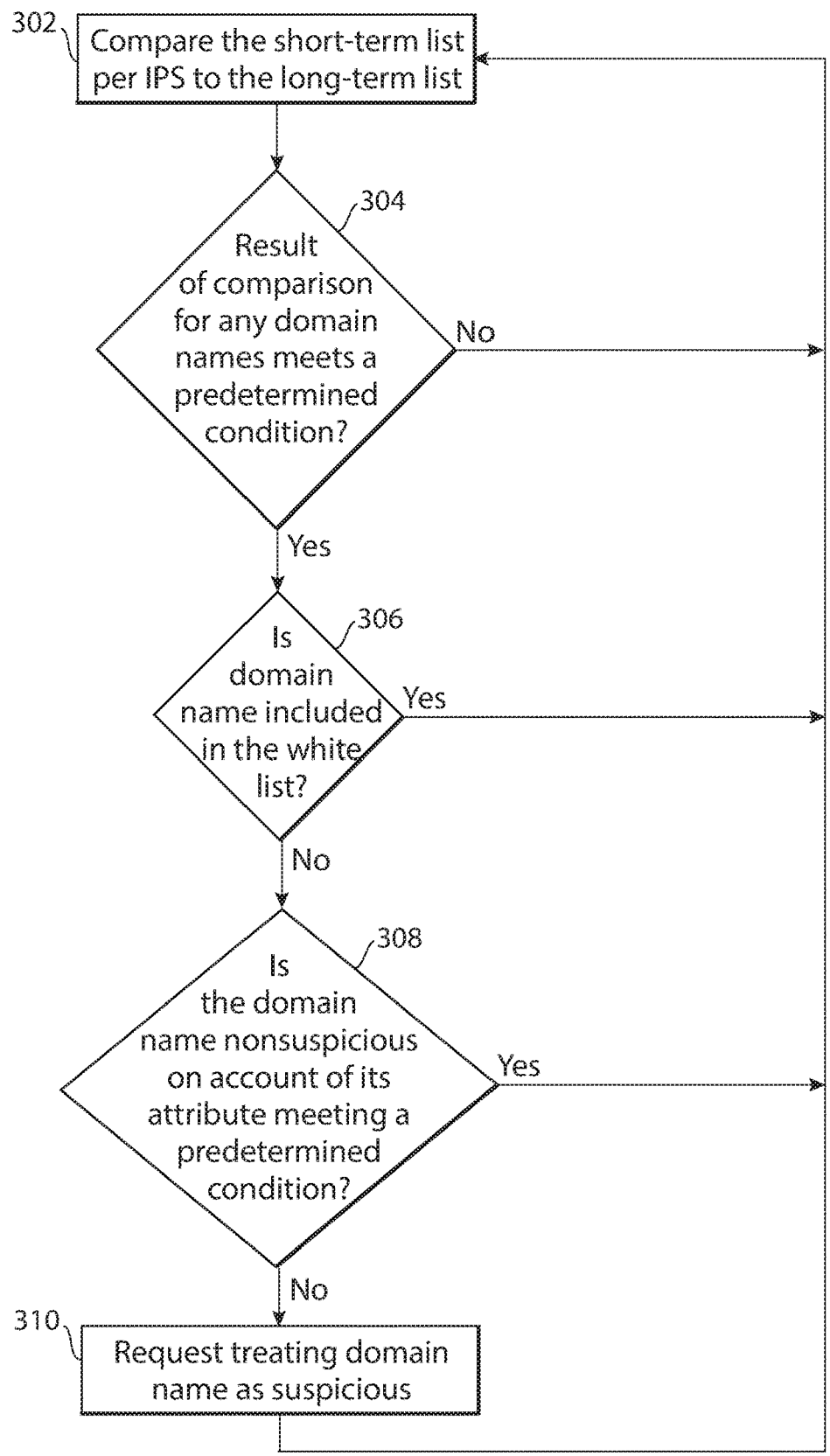
FIG. 3 is an example flowchart showing a method performed by a suspicious traffic detection device of the network protection system shown in FIG. 1.

With reference now to FIGS. 2 and 3, shown are flowcharts demonstrating implementation of the various exemplary embodiments. It is noted that the order of operations shown in FIGS. 2 and 3 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 2 shows a flowchart of operations performed by a network monitor, such as network monitor 102 shown in FIG. 1. At operation 202 network traffic transmitted from IPSs, such IPSs 114 shown in FIG. 1, is monitored for observing or analyzing contents of packets of the network traffic.

At operation 204, a determination is made whether a packet being observed or analyzed includes a domain name, e.g., also referred to herein as a DNS name.

If the determination at operation 204 is YES, meaning that the packet includes a domain name, the method continues at operation 206. Otherwise, if the determination at operation 204 is NO, meaning that the packet does not include a domain name, the method returns to operation 202.

At operation 206, a determination is made whether the domain name is unique for the IPS that sent the packet over the course of a short time interval. If the determination at operation 206 is YES, meaning that the domain is unique for the IPS over the course of the short time interval, then the method continues at operation 208 in which the domain name is stored in a short-term collection for the IPS. Otherwise, if the determination at operation 206 is NO, meaning the domain is not unique for the IPS over the course of the short time interval, the method continues at operation 210.

At operation 210, a determination is made whether the domain name is unique for the IPS that sent the packet over the course of a long time interval. If the determination at operation 210 is YES, meaning that the domain is unique for the IPS over the course of the long time interval, then the method continues at operation 212 in which the domain name is stored in a long-term collection for the IPS. Otherwise, if the determination at operation 210 is NO, meaning the domain is not unique for the IPS over the course of the long time interval, the method repeats by returning to operation 202.

With reference to FIG. 3, a flowchart is shown of a method that can be performed by the suspicious traffic detection device, such as suspicious traffic detection device 110 shown in FIG. 1. In one or more embodiments, the method shown in FIG. 3 is performed in real time at the same time as performance of the method shown in FIG. 2. In one or more embodiments, the method shown in FIG. 3 is performed after performance of the method shown in FIG. 2, such as offline or during time periods in which computer resources for the suspicious traffic detection device have high availability.

At operation 302, the short-term list is compared per IPS to the long-term list. At operation 304, a determination is made whether a result of the comparison performed at operation 302 for any domain names meets a predetermined condition. Examples of predetermined conditions include the suspicious domain name having been included in a predetermined amount of second collections, but not in the first collection, for a threshold number of IPSs.

If the determination at operation 304 is YES, meaning the results of the comparison met the predetermined condition, then the method continues at operation 306. Else, if the determination at operation 304 is NO, meaning the results of the comparison did not meet the predetermined condition, the method continues at operation 302, such as for continuing or repeating the comparison for the various IPSs as the long-term and short-term collections are updated by the network monitor.

At operation 306, a determination is made whether the domain name is included in a white list that lists domain names that are confirmed to be nonsuspicious. If the determination at operation 306 is NO, meaning the domain name is not included in the white list, the method continues at operation 308. Else, if the determination at operation 306 is YES, meaning the domain name is included in the white list, the method continues at operation 302, such as for continuing or repeating the comparison for the various IPSs as the long-term and short-term collections are updated by the network monitor.

At operation 308, a determination is made whether the domain name is nonsuspicious on account of meeting a predetermined condition. An example of the attribute is an amount of time for which the domain name has been registered. For example, the predetermined condition can be defined as whether the amount of time for which the domain name has been registered attribute is at least a predetermined threshold amount of time.

If the determination at operation 308 is NO, meaning the domain name is suspicious because its attribute does not meet the predetermined condition, the method continues at operation 310. Else, if the determination at operation 308 is YES, meaning the domain name is nonsuspicious because its attribute meets the predetermined condition, the method continues at operation 302, such as for continuing or repeating the comparison for the various IPSs as the long-term and short-term collections are updated by the network monitor.

At operation 310, a request is made to treat the domain name as being suspicious. The request can be transmitted to a mitigation device, such as mitigation device 108 shown in FIG. 1. Examples of treatments that can be applied to a domain name for which it has been requested to treat the domain name as suspicious include taking a precautionary action and/or taking a blocking action.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network monitor 102 or suspicious traffic detection device 110 may be implemented or executed by one or more computer systems. For example, network monitor 102 or suspicious traffic detection device 110 can be implemented using a computer system such as example computer system 402 illustrated in FIG. 4. In various embodiments, computer system 402 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 402 is only one example of a suitable system and is not intended to suggest any limitation as to the scope of use or functionality of embodiments of the disclosure described herein. Regardless, computer system 402 is capable of being implemented and/or performing any of the functionality set forth hereinabove.

Computer system 402 may be described in the general context of computer system-executable instructions, such as program modules, being executed by a computer system. Generally, program modules may include routines, programs, objects, components, logic, data structures, and so on that perform particular tasks or implement particular abstract data types. Computer system 402 may be practiced in distributed data processing environments where tasks are performed by remote processing devices that are linked through a communications network. In a distributed data processing environment, program modules may be located in both local and remote computer system storage media including memory storage devices.

Figure 4:
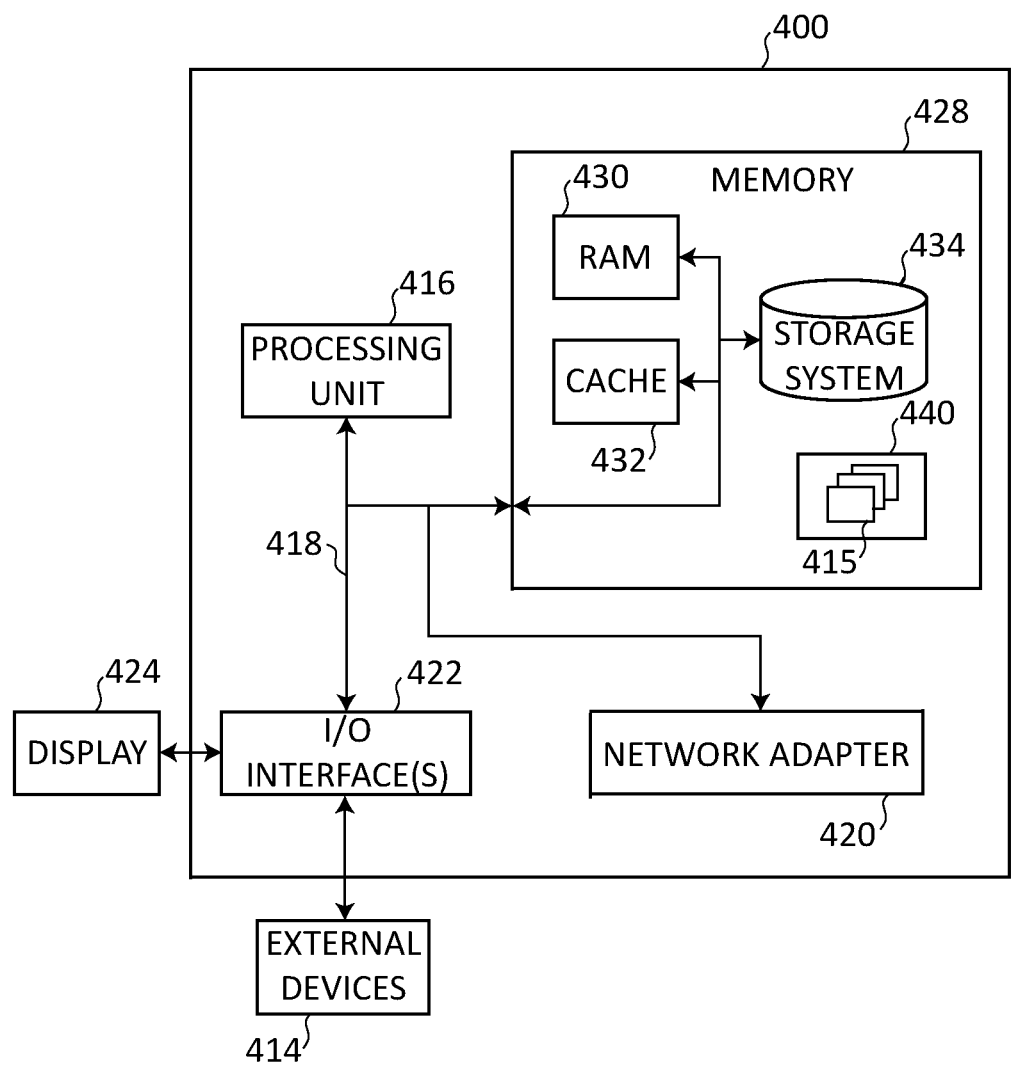
FIG. 4 illustrates an example computing system that could be used to implement a network monitor and/or suspicious traffic detection device of a network protection system.

Computer system 402 is shown in FIG. 4 in the form of a general-purpose computing device. The components of computer system 402 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 402 typically includes a variety of computer system readable media. Such media may be any available media that is accessible by computer system 402, and it includes both volatile and non-volatile media, removable and non-removable media.

System memory 428 can include computer system readable media in the form of volatile memory, such as random access memory (RAM) 430 and/or cache memory 432. Computer system 402 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 415, such as computer system 402, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the disclosure as described herein.

Computer system 402 may also communicate with one or more external devices 414 such as a keyboard, a pointing device, a display 424, etc.; one or more devices that enable a user to interact with computer system 402; and/or any devices (e.g., network card, modem, etc.) that enable network monitor 102 or suspicious traffic detection device 110 to communicate with one or more other computing devices. Such communication can occur via Input/Output (I/O) interfaces 422. Still yet, computer system 402 can communicate with one or more networks such as a local area network (LAN), a general wide area network (WAN), and/or a public network (e.g., the Internet) via network adapter 420. As depicted, network adapter 420 communicates with the other components of network management server 104 via bus 418. It should be understood that although not shown, other hardware and/or software components could be used in conjunction with computer system 402. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the network monitor 102 or suspicious traffic detection device 110 include the ability to detect attacks in very early stages of the attack, namely a phishing stage. Mitigation of the detected attack can also be provided at these early stages, including in real time.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method to manage threats to a protected network having a plurality of internal production systems, the method comprising:
    monitoring network traffic from the plurality of internal production systems of the protected network for domain names;
    determining, for each internal production system of the plurality of internal production systems over the course of a long time interval, a first collection of domain names that are output by the internal production system;
    determining, for each internal production system of the plurality of internal production systems over the course of a short time interval, a second collection of domain names that are output by the internal production system, the short time interval subsequent to the long time interval;
    comparing, for each internal production system of the plurality of internal production systems, the domain names in the first collection with the domain names in the second collection;
    identifying one or more internal production systems of the plurality of internal production systems for which one or more domain names are included in the domain names in the second collection and are absent from the domain names in the first collection;
    determining that the one or more domain names are suspicious domain names when it is determined that a number of the one or more internal production systems satisfies a threshold number of internal production systems; and
    requesting to treat the one or more domain names as suspicious.

2. The method of claim 1, further comprising comparing the one or more domain names to a white list, wherein only the one or more domain names that are not on the white list are requested to be treated as suspicious.

3. The method of claim 1, further comprising:
    determining an attribute associated with a domain name associated with a suspicious domain name of the one or more domain names;
    applying a condition to the attribute determined; and
    determining not to request that the suspicious domain name be treated as suspicious when the condition is met.

4. The method of claim 3, further comprising accessing information about registration of the domain name to determine the attribute.

5. The method of claim 4, wherein the attribute is age of the domain name from a time of registration as indicated by the information about registration and the condition is whether the age of the domain name is at least a threshold age.

6. The method of claim 1, wherein the method further includes treating the one or more domain names as suspicious by taking a precautionary action to warn users of at least one internal production system of the plurality of internal production systems in the protected network about the one or more domain names.

7. The method of claim 1, wherein the method further includes treating the one or more domain names as suspicious by taking a blocking action to block packets that include the one or more domain names.

8. A computer system for managing threats to a protected network, comprising:
- a memory configured to store instructions;
- one or more processors disposed in communication with said memory, wherein the one or more processors upon execution of the instructions are configured to:
  - monitor network traffic from a plurality of internal production systems of the protected network for domain names;
  - determine, for each internal production system of the plurality of internal production systems over the course of a long time interval, a first collection of domain names that are output by the internal production system;
  - determine, for each internal production system of the plurality of internal production systems over the course of a short time interval, a second collection of domain names that are output by the internal production system, the short time interval subsequent to the long time interval;
  - compare, for each internal production system of the plurality of internal production systems, the domain names in the first collection with the domain names in the second collection;
  - identify one or more internal production systems of the plurality of internal production systems for which one or more domain names are included in the domain names in the second collection and are absent from the domain names in the first collection;
  - determine that one or more domain names are suspicious domain names when it is determined that a number of the one or more internal production systems satisfies a threshold number of internal production systems; and
  - request to treat the one or more domain names as suspicious.

9. The computer system of claim 8, wherein the one or more processors upon execution of the instructions are further configured to compare the one or more domain names to a white list, wherein only the one or more domain names that are not on the white list are requested to be treated as suspicious.

10. The computer system of claim 8, wherein the one or more processors upon execution of the instructions are further configured to:
- determine an attribute associated with a domain name associated with a suspicious domain name of the one or more domain names; apply a condition to the attribute determined; and determine not to request that the suspicious domain name be treated as suspicious when the condition is met.

11. The computer system of claim 10, wherein the one or more processors upon execution of the instructions are further configured to access information about registration of the domain name to determine the attribute.

12. The computer system of claim 11, wherein the attribute is age of the domain name from a time of registration as indicated by the information about registration, and the condition is whether the age of the domain name is at least a threshold age.

13. The computer system of claim 8, wherein the one or more processors upon execution of the instructions further configured to treat the one or more domain names as suspicious, including taking a precautionary action to warn users of at least one internal production system of the plurality of internal production systems in the protected network about the one or more domain names.

14. The computer system of claim 8, wherein the one or more processors upon execution of the instructions are further configured to treat the one or more domain names as suspicious, including taking a blocking action to block packets that include the one or more domain names.

15. A non-transitory computer readable storage medium and one or more computer programs embedded therein, the computer programs comprising instructions, which when executed by a computer system, cause the computer system to:
- monitor network traffic from a plurality of internal production systems of a protected network for domain names;
- determine, for each internal production system of the plurality of internal production systems over the course of a long time interval, a first collection of domain names that are output by the internal production system;
- determine, for each internal production system of the plurality of internal production systems over the course of a short time interval, a second collection of domain names that are output by the internal production system, the short time interval subsequent to the long time interval;
- compare, for each internal production system of the plurality of internal production systems, the domain names in the first collection with the domain names in the second collection;
- identify one or more internal production systems of the plurality of internal production systems for which one or more domain names are included in the domain names in the second collection and are absent from the domain names in the first collection;
- determine that one or more domain names are suspicious domain names when it is determined that a number of the one or more internal production systems satisfies a threshold number of internal production systems; and
- treat the one or more domain names as suspicious.

16. The non-transitory computer readable storage medium of The non-transitory computer readable storage medium of wherein the computer system is further caused to compare the one or more domain names to a white list, wherein only the one or more domain names that are not on the white list are treated as suspicious.

17. The non-transitory computer readable storage medium of The non-transitory computer readable storage medium of wherein the computer system is further caused to:
- determine an attribute associated with a domain name associated with a suspicious domain name of the one or more domain names;
- apply a condition to the attribute determined; and determine not to treat the suspicious domain name as suspicious when the condition is met.

* * * * *